United States Patent Office 3,281,374
Patented Oct. 25, 1966

3,281,374
EMULSIONS CONTAINING POLYMERIC HIGHER
FATTY ALCOHOLS
Guntram Walther, Dusseldorf-Eller, and Werner Stein,
Dusseldorf-Holthausen, Germany, assignors to Dehydag Deutsche Hydrierwerke G.m.b.H., Dusseldorf, Germany, a corporation of Germany
No Drawing. Filed Mar. 8, 1963, Ser. No. 263,733
Claims priority, application Germany, Mar. 14, 1962,
D 38,355
5 Claims. (Cl. 252—309)

This invention relates to a process for the preparation of emulsions with the aid of polymeric fatty alcohols.

Polymeric fatty alcohols are understood to include compounds which are obtained by thermal or catalytic polymerization from high molecular unsaturated fatty alcohols having at least 12 carbon atoms such as by the process of patent application U.S. Serial No. 199,263, filed June 1, 1962.

The polymerization occurs at the double bond without splitting off water, that is, the hydroxyl groups of the starting materials remain unchanged in the polymerization product. In addition, these products may also be obtained by polymerizing the corresponding unsaturated fatty acids or their esters instead of the unsaturated fatty alcohols, the polymerization proceeding according to the same principle, and subsequently reducing the carboxyl or ester groups into hydroxyl groups. They are also accessible by reduction of polymeric fatty acids or fatty acid esters of analogous structure, for instance by means of catalytic hydrogenation. In general, these alcohols are mixtures of dimeric, trimeric and sometimes also high-molecular weight polyols, wherein the dimeric diols predominate as a rule.

It is known that high-molecular weight fatty alcohols, such as the naturally occurring cetyl- or ceryl-alcohol, possess emulsifying properties, but these properties are only briefly evident. Consequently, the preparation of water-in-oil emulsions (W/O-emulsions) with fatty alcohols as to sole emulsifier requires the use of mechanical assistants. Simple stirring of the two phases in the presence of a fatty alcohol leads at best to coarse, rapidly decomposing dispersions. The relatively low degree of water-binding and stability of the emulsions is believed to be caused by the relatively weak hydrophilic activity of the hydroxyl group as against the strong hydrophobic activity of the hydrocarbon chain of the fatty alcohol. For this reason, the long-chain aliphatic alcohols are only seldom used as sole emulsifiers. Most often they are combined with other emulsifiers or are used primarily in the form of their derivatives, such as in the form of fatty alcohol sulfate salts or polyglycol ethers.

It is further known that the properties of the emulsifier are substantially improved by the production of one or more additional hydrophilic groups in neighboring position to the first hydrophilic group. However, the opposite effect occurs when the additional group is not in neighboring poistion to the first group but instead is located in a more remote position, especially at the opposite end of the carbon chain. Hydrocarbon chains with two terminal hydrophilic substituents as a rule exhibit no emulsifying properties, or only very substantially reduced emulsifying properties.

It is therefore an object of this invention to provide water-in-oil emulsions where polymeric higher fatty alcohols are used as the sole emulsifiers.

A further object is to provide an emulsifier for water-in-oil emulsions requiring no, or very little, mechanical assistance for emulsification, which is a polymeric higher fatty alcohol.

Another object is to provide stable emulsions containing water and a polymeric higher fatty alcohol.

These and other objects of our invention will become apparent as the description thereof proceeds.

In accordance with the present invention, polymers of those bis- or higher-polyunsaturated conjugated fatty alcohols are used which contain at least 12, preferably 18 to 26 carbon atoms in the molecule and one terminal, primary hydroxyl group. Fatty alcohols of a suitable type for this purpose are dodecylene alcohol, oleyl alcohol, ricinoleyl alcohol, linoleyl alcohol and similar unsaturated high-molecular weight fatty alcohols or wax alcohols, which are obtainable from mono- or poly-unsaturated naturally occurring oils, fats or waxes by suitable chemical treatment of the esters contained therein. Therefore, it is also possible to use the fatty alcohol mixtures formed thereby which contain some saturated components.

Since these alcohols upon polymerization lead to products whose terminal hydroxyl groups may be separated from each other by 18 or more carbon atoms with respect to the position of the double bond in the starting material, it could not have been expected according to the state of the art that these polymers would exhibit appreciable emulsifying properties. Instead, in accordance with experience, this structure would have expected to lead to a reduction in the emulsifying properties. A sulfation of the two terminal hydroxyl groups of the dimeric fatty alcohol (see U.S. Patent 2,347,562) results in wetting- and washing-properties which are poorer than those exhibited by the monomeric fatty alcohol sulfates. From this fact it could be concluded in analogous fashion that the surfactant properties of the starting products would be adversely altered by the polymerization.

We have now made the surprising discovery that polymeric fatty alcohols of the above described type are, alone or in combination with other dispersing agents, excellent emulsifiers for W/O-mixtures and that they are considerably superior in this respect to monomeric alcohols. Similar to monomeric alcohols, they are pronounced W/O-emulsifiers. However, small additions of wetting agents with a strong hydrophilic effect, such as fatty alcohol sulfates, alkyl polyglycol ether sulfates, glycerin alkyl ether sulfates or glycerin alkyl ester sulfates and the like in amounts up to 10% (based on the amount of fatty alcohol used) produce a phase reversal of the emulsions and the formation of very stable oil-in-water emulsions (O/W-emulsions).

In these emulsions, the term oil is meant to include not only oils, but also fats and waxes. The formation of the emulsion proceeds extraordinarily easily. By simply stirring by hand, it is possible to transform W/O-mixtures into completely homogeneous dispersions. In this way it is possible to produce emulsions which contain the polymeric fatty alcohols and the oils, fats or waxes in a ratio of about 3:97 to 30:70. If used for the preparation of pharmaceutical or cosmetic emulsions as described below, in which the polymeric fatty alcohols may be an active ingredient the amount of these polymeric fatty alcohols may be higher.

Whereas emulsions of the W/O-type can generally be brought to a water content of only no more than 60 to 75% with the aid of customary emulsifiers, the employment of polymeric fatty alcohols according to the present invention makes it possible to produce emulsions with a water content of above 90% without the occurrence of phase reversal or decomposition. The emulsions are characterized by high stability even after standing for several months; no breakdown occurs in the emulsions produced by simple stirring by hand.

Depending upon the choice of fatty alcohol emulsifier, the water content and the type of emulsion, emulsions of pasty solids, creamy or liquid consistency are obtained, which have various uses in the cosmetic, pharmaceutical, technical or industrial fields. In addition, the polymeric fatty alcohols are not only useful as emulsifiers for a great variety of natural or synthetic fats, oils or waxes, but they may also themselves be worked into stable, creamy to pasty W/O-emulsions which may absorb above 90% of water (based on the amount of fatty alcohol used). The water content and the stability of such water-containing creams against temperature variations may be further increased by the addition of small amounts up to 25% (based on the amount of fatty alcohol used) of other emulsifiers, such as fatty acid monoglycerides or fatty acid ethoxylation products, or fatty alcohol ethoxylation products.

The polymeric fatty alcohols used in accordance with the present invention react neutral and are stable against strong acids and alkalis, which represents a considerable advantage over a great number of known emulsifiers, such as esters, amides, soaps, etc. Since the polymeric fatty alcohols are obtainable from natural fatty substances without the introduction of additional chemical groups, they represent skin-compatible substances which are rapidly absorbed by the skin, make it supple and are not tacky or greasy. The good skin absorption promotes the resorption of soluble or insoluble, finely divided pharmaceutical or cosmetic active ingredients throughout the skin, so that such creams, ointments, linaments, etc. containing such active ingredients have a considerable deep penetration effect. Since the polymeric fatty alcohols exhibit a strong absorption in the range of ultraviolet light, which amounts to practically 100% from 280 m$\mu$ on and 80% beginning at 30 m$\mu$, they are also excellently suitable for the preparation of light screening creams or linaments. Thus, compositions, for the care of the skin and the like produced on the basis of polymeric fatty alcohols also exhibit at the same time a sun screening effect.

Unsaturated polymeric fatty alcohols produced from highly unsaturated oils such as from linseed oil or wood oil, exhibit useful drying properties. In the presence of siccatives, they produce firmly adhering, transparent films of high acid and alkali resistance in the air and are, therefore, excellently suitable for the preparation of aqueous emulsions for protection of surfaces and coating purposes.

The following examples are set forth to further illustrate the invention and to enable persons skilled in the art to better understand and practice the invention, and are not intended to be limitative.

*Example I*

10 gm. of a mixture of polymeric fatty alcohols (Hydroxyl No. 208, Iodine No. 78, composition: 2% monomers, 84% dimers, 14% trimers), obtained from cottonseed oil by catalytic hydrogenation into unsaturated fatty alcohols and subsequent polymerization, were gradually stirred by hand into 80 gm. of water in a beaker. A colorless and odorless emulsion of smooth, supple consistency was obtained. In a test run, it remained stable over a period of several weeks at 0° C. At 25° C. a minor separation of water or oil began after 10 days. A comparative test with a monomeric fatty alcohol mixture of the same starting material did not result in emulsion formation under the same conditions.

*Example II*

8 gm. of the polymeric fatty alcohol mixture used in Example I were stirred into an emulsion under the same conditions as in Example I with 2 gm. of technical grade maleic acid monoglyceride and 90 gm. of water. The smooth, creamy emulsion did not exhibit any change after several months of storage at 25° C. At a temperature of 40° C., the emulsion began to decompose after about 15 hours, and at 60° C., the decomposition began after 4 hours. In contrast thereto, the decomposition of an emulsion prepared analogously with the monomeric fatty alcohol mixture already occurred at a maximum water content of 60% after a few hours, and within a few minutes at more elevated temperatures.

*Example III*

10 gm. of fatty alcohol mixture (Hydroxyl No. 206, Iodine No. 86, composition: 3% monomers, 81% dimers, 16% trimers), produced from soybean oil by reduction and polymerization, were admixed with 2 cc. of a 25% aqueous solution of sodium coconut fatty alcohol sulfate, which corresponds to an amount of 5% by weight of sodium alkyl sulfate, based on polymeric fatty alcohols. Stirring of this mixture by hand with 25 gm. of water resulted in a creamy W/O-emulsion. After addition of another 10 gm. of water, a phase reversal occurred and a viscous O/W-emulsion was formed. Water contents above 50% led to a milky emulsion. In both phase conditions and also in the range of phase reversal, the emulsions were stable over a period of several months.

*Example IV*

15 gm. of beef tallow (melting point about 58° C., Iodine No. 1) and 5 gm. of the fatty alcohol used in Example III were emulsified as previously described in 60 gm. of water, which corresponds to a water content of the emulsion of 75%. The W/O-emulsion of butter-like consistency formed thereby exhibited no signs of decomposition over an observation period of two months at a temperature of 25° C. When heated to 60° C., decomposition took place within two to three hours. An increase of the water content to 87% reduced the stability of the emulsion only to a minor degree. The small amount of water or oil which separated out over a period of three weeks could again be completely dispersed by simple stirring.

*Example V*

16 gm. of vaseline (melting point range 45 to 55° C.) were admixed with 4 gm. of the polymeric fatty alcohol mixture used in Examples I and II, and the mixture was emulsified with 60 gm. of water took only two to three minutes despite simple stirring by hand. The resulting emulsion was of a smooth, creamy consistency. As to its stability its substantially corresponded to the above described mixtures in the foregoing examples.

*Example VI*

15 gm. of beef tallow (melting point about 58° C., Iodine No. 1) were emulsified with 5 gm. of a dimeric fatty alcohol (Hydroxyl No. 205, Iodine No. 0; composition: 4% monomers, 80% dimers, 16% trimers), which was prepared by polymerization of cottonseed oil fatty acids and reduction of the methylesters of the polymeric fatty acids with hydrogen in the presence of a copper chromite catalyst, and with 60 gm. of water which corresponded to a water content of the emulsion of 75%. The W/O-emulsion formed thereby, which had a semisolid consistency, exhibited only a slight separation of water after 24 hours at 25 to 30° C. After 14 days the emulsion was partially decomposed but it could be completely restored again by briefly stirring it.

When 0.5 gm. of oleic acid monoglyceride was added to the mixture at the beginning, no breakdown of the mixture could be observed over a period of three months.

Comparative tests with an analogous monomeric fatty alcohol mixture did not result in stable emulsions. The maximum achievable water content was about 15% and the coarse dispersion formed thereby decomposed completely after ten minutes.

*Example VII*

20 gm. of coconut fat (melting point about 27 to 28° C.) and 1 gm. of the polymeric fatty alcohol used in Example III were emulsified as previously described with 70 gm. of water. The resulting stable emulsion was of a smooth, creamy consistency.

When adding 0.6 gm. of polymeric fatty alcohol to 20 gm. of coconut fat, the emulsion may be brought up to a water content of 40 gm. As to its stability at 25° C. it substantially corresponded to the above described mixtures in the foregoing examples.

While we have set forth certain specific embodiments and preferred modes of practice of our invention, it will be understood that the invention is not limited thereby, and that various changes and modifications may be made without departing from the spirit of the disclosure or the scope of the appended claims.

We claim:

1. An emulsion consisting essentially of (1) a polymeric fatty alcohol having from 24 to 78 carbon atoms and a molecular weight from 360 to 1150, each monomeric moiety of said polymeric fatty alcohol having from 12 to 26 carbon atoms and a terminal primary hydroxyl group, (2) an oil phase, and (3) an aqueous phase.

2. An emulsion according to claim 1 wherein the oil phase is selected from the group consisting of oils, fats and waxes, and the ratio of the polymeric fatty alcohol to the oil phase is from about 3:97 to 30:70.

3. An emulsion according to claim 1 wherein the oil phase is a polymeric fatty alcohol having from 12 to 26 carbon atoms and a terminal primary hydroxyl group in each monomeric moiety.

4. An emulsion according to claim 1 wherein the emulsion is a water in oil emulsion.

5. An emulsion according to claim 1 wherein the emulsion is an oil in water emulsion and contains up to 10%, based on the amount of polymerized fatty alcohol, of a hydrophilic wetting agent selected from the group consisting of fatty alcohol sulfates, alkyl polyglycol ether sulfates, glycerin alkyl ether sulfates and glycerin alkyl ester sulfates.

References Cited by the Examiner

UNITED STATES PATENTS 2,096,947  10/1937  Voorhees _____ 252—312 X
2,158,374  5/1939   Merrill  _____ 252—312

LEON D. ROSDOL, *Primary Examiner.*

JULIUS GREENWALD, *Examiner.*

R. D. LOVERING, *Assistant Examiner.*